United States Patent [19]

McDonald et al.

[11] Patent Number: 4,464,442
[45] Date of Patent: Aug. 7, 1984

[54] BRAZING ALLOY

[75] Inventors: Thomas J. McDonald, Sutton Coldfield; Christopher Follows, Parkside, both of England

[73] Assignee: IMI Marston Limited, Wolverhampton, England

[21] Appl. No.: 512,952

[22] Filed: Jul. 13, 1983

Related U.S. Application Data

[63] Continuation of Ser. No. 253,375, Apr. 13, 1981, abandoned.

[30] Foreign Application Priority Data

Apr. 29, 1980 [GB] United Kingdom ............... 8014081

[51] Int. Cl.³ ...................... B32B 15/01; B32B 15/20; C22C 21/04
[52] U.S. Cl. .................................. 428/654; 420/546; 420/554
[58] Field of Search ............... 428/654; 420/542, 546, 420/548, 554

[56] References Cited

U.S. PATENT DOCUMENTS

| | | | |
|---|---|---|---|
| 3,807,033 | 4/1974 | Schoer et al. | 29/494 |
| 3,811,177 | 5/1974 | Schoer et al. | 29/494 |
| 3,843,333 | 10/1974 | Woods | 29/191 |
| 3,853,547 | 12/1974 | Singleton | 75/147 |
| 3,898,053 | 8/1975 | Singleton | 428/654 |
| 3,900,151 | 8/1975 | Schoer et al. | 228/220 |
| 3,963,453 | 6/1976 | Singleton | 428/654 |
| 4,040,822 | 8/1977 | Stern | 420/530 |
| 4,121,750 | 10/1978 | Schoer et al. | 228/219 |
| 4,173,302 | 11/1979 | Schultz et al. | 228/219 |

FOREIGN PATENT DOCUMENTS

| | | |
|---|---|---|
| 2213272 | 9/1973 | Fed. Rep. of Germany . |
| 51-96749 | 8/1976 | Japan . |
| 52-16447 | 2/1977 | Japan . |
| 53-30448 | 3/1978 | Japan . |
| 54-17349 | 2/1979 | Japan . |
| 54-121214 | 9/1979 | Japan . |
| 1067024 | 4/1967 | United Kingdom . |
| 1169104 | 10/1969 | United Kingdom . |
| 1328642 | 8/1973 | United Kingdom . |
| 1379139 | 1/1975 | United Kingdom . |
| 1462506 | 1/1977 | United Kingdom . |
| 1465725 | 3/1977 | United Kingdom . |
| 1376778 | 6/1977 | United Kingdom . |
| 1480502 | 7/1977 | United Kingdom . |
| 1584580 | 2/1981 | United Kingdom . |

Primary Examiner—Brian E. Hearn
Assistant Examiner—David A. Hey
Attorney, Agent, or Firm—Cushman, Darby & Cushman

[57] ABSTRACT

A sheet of brazing alloy foil, a clad sheet of aluminum, a brazed large section structure or a method of vacuum brazing large aluminium structures utilizing a brazing alloy based on aluminium and containing 4.5 to 13.5% silicon, 0.1 to 1.5% strontium and up to 3% magnesium.

10 Claims, No Drawings

BRAZING ALLOY

This is a continuation, of application Ser. No. 253,375, filed Apr. 13, 1981 now abandoned.

BACKGROUND OF THE INVENTION

This invention relates to sheets of brazing alloy foil, clad sheets of aluminium for use in the brazing of large section structures, brazed large section aluminium structures or methods of brazing large aluminium structures and is essentially concerned with the brazing alloys for such products and processes.

In the brazing of aluminium and its alloys one difficulty which is encountered is the removal of the oxide film which is formed upon aluminium when it is in contact with air. Various methods of removing the oxide film to enable aluminium or aluminium alloy parts to be joined together have been employed.

Basically there are three methods of removing the oxide film. The first method is to use a flux which essentially consists of a mixture of chloride and fluoride salts of the alkaline-like metals potassium, sodium, lithium and aluminium. Essentially the flux is maintained at a temperature between the melting point of the brazing alloy and the melting point of the core aluminium and the assembled structure is dipped into the molten flux to melt the brazing alloy and effect the joint.

A second method is to use a furnace brazing operation in which the parts to be joined are heated in a furnace in an atmosphere which is substantially oxygen-free. Various alloys are used in furnace brazing which are intended to enable flow of the brazing alloy to occur and to enable the aluminium parts to be wetted through the oxide layer.

More recently there has been developed a process of brazing aluminium in a vacuum, the process involving the use of a magnesium containing brazing alloy. The magnesium effectively displaces the oxide film and acts as a getter and so enables the aluminium parts to be brazed together. The process of brazing in the presence of magnesium is described in British patent specification No. 1 067 024.

Each of the processes used to join the aluminium structures together have their attendant problems. Thus, with flux brazing the fluxes tend to be corrosive and have to be removed after brazing has occurred. Furnace brazing has problems associated with the certainty of making joints throughout the entire structure, owing to the presence of the oxide film. Vacuum brazing has advantages over both flux dip brazing and furnace brazing except that it involves the use of expensive high vacuum furnaces, but it does enable very high quality products to be prepared. Because of the need to provide a vacuum articles produced by vacuum brazing have, in the main, been relatively small, such as small turbo chargers, radiators for vehicles etc.

It has now unexpectedly been discovered that there are particular problems associated with vacuum brazing large section structures by the route described in the above patent specification. By "large section structures" as is used herein is meant structures which are of a size greater than a cube of 0.25 m length along each side. The problems referred to above basically relate to strength of the brazed joints in the heat exchanger.

The quantity of magnesium in the alloy must be sufficient to permit adequate brazing of the alloy in a vacuum. Typically magnesium contents below about 0.5% would be unlikely to give adequate vacuum brazing of structures, particularly large structures. However, it may be possible for the magnesium to be present in the core of clad alloys.

Literature surveys do not indicate any differences in the strength of structures produced by flux dip brazing, whether such structures are of large section or small section. It would be thought, therefore, that there would be no difference in strength between vacuum brazed structures which are of large or small section.

It has now been discovered that higher strength structures can be provided by utilising the brazing alloys of the present invention in the methods described herein. The strength of the large section structures is particularly noted in relation to the burst pressure at which heat exchangers fail when internally pressurised after brazing in accordance with the prior art and in accordance with the present invention. These failures are not fatigue failures but merely tensile or shear failures resulting from the application of internal pressure.

SUMMARY OF THE INVENTION

By the present invention there is provided a sheet of brazing alloy foil for use in the brazing of large section structures, the alloy essentially consisting of by weight silicon 4.5% to 13.5%, magnesium up to 3%, strontium 0.1% to 1.5%, balance aluminium, apart from incidental impurities.

The present invention also provides a clad sheet of aluminium for use in the brazing of large section structures, the clad sheet having on at least one of its sides an alloy essentially consisting of by weight silicon 4.5% to 13.5%, magnesium up to 3%, strontium 0.1% to 1.5%, balance aluminium, apart from incidental impurities. The alloy may be clad on both sides of the sheet. The core may comprise commercially pure aluminium or a different alloy of aluminium or a magnesium containing alloy or either of these. It will be appreciated that a flat sheet has essentially two sides or faces and is surrounded by an edge.

The present invention yet further provides a brazed large section structure of aluminium in which the brazing is effected by an alloy of aluminium characterised in that the alloy essentially consists of by weight silicon 4.5% to 13.5%, magnesium up to 3%, strontium 0.1% to 1.5%, balance aluminium, apart from incidental impurities.

The present invention also provides a method of brazing a large aluminium structure which includes the steps of assembling the structure, providing a brazing alloy in the region of joints to be formed in the structure and heating the assembled structure in a vacuum, characterised in that the brazing alloy essentially consists of by weight 4.5% to 13.5% silicon, 0.1% to 1.5% strontium, magnesium up to 3%, balance aluminium, apart from incidental impurities.

The sheet of foil, clad sheet of aluminium, brazed large section structure or method may be adopted utilising a brazing alloy containing strontium in an amount in the region 0.1% to 1%, preferably 0.1% to 0.3%, and further preferably 0.2%. The brazing alloy may be modified to additionally contain bismuth in the range 0.1% to 4%, preferably 0.2% to 0.3% with a preferred content of 0.25%. The magnesium content may be in the range 1% to 2%, preferably 1.5%. The silicon content may be selected from the values 5%, 7.5% or the range 8% to 12%.

It will be seen that the modification to conventional aluminium-silicon brazing alloys comprises the addition of strontium in the range 0.1% to 1%. It has unexpectedly been found that strontium of all known metals has improved the strength of brazed joints in heat exchangers when added to the brazing alloy. It might be considered, although this explanation is provided without detriment to the present invention, that the reason the strontium is improving the strength of the heat exchangers is that it modifies the size and hence the number of silicon particles formed in the brazing alloy eutectic which cools after brazing. Presumably the problem associated with vacuum brazing large section structures is that the rate of cooling is necessarily slow, for reasons which will be explained below, and this produces circumstances which can promote the growth of silicon particles, and this may be considered to adversely affect the strength of the eventual joint.

In U.S. Pat. No. 3 843 333 there is described an improvement in aluminium brazing sheets wherein a high silicon cladding is used and the silicon particles are less than 7 microns in maximum diameter. A number of additions to the alloy are described to reduce the silicon particle size prior to brazing to improve the flowability of the brazing alloys, one of which is strontium, and it is stated that the strontium addition should be present in the amount between 0.005% and 0.07%. It has to be noted that the level of strontium is low, and furthermore that the Patentees are concerned with restricting particle size in the clad composite, i.e. in the composite prior to brazing. In this particular application the Patentees indicate that the flowability of the high silicon cladding material increases with the silicon level, but this leads to an increase in the brittleness of the subsequent brazement due to the formation of coarse silicon-rich particles. The invention is alleged to reside in the fact that the use of a finer silicon structure in the cladding material increases the flowability of the cladding at lower brazing temperatures, thus significantly improving the brazing characteristics without detrimentally affecting the resultant brazed joint. This prior application is in no way concerned with the vacuum brazing of large section structures and makes no comment regarding the size of the structure as such. The intention appears to be the provision of a clad sheet in which the silicon particle size can be maintained at as low a value as possible. The mechanism chosen to maintain the small particle size is to include at least one element of the group sodium, potassium, calcium and strontium in an amount between 0.005% and 0.07%. Sodium appears to be the preferred additive to the alloy. Although this may be satisfactory for small vacuum brazed structures the patentees do not distinguish between small and large structures and no satisfactory brazed structures which are of large section have been made with alloys of this type of composition.

Furthermore, in contradiction to the information in U.S. Pat. No. 3 843 333, it has been found that neither potassium nor sodium enable stronger heat exchangers to be manufactured of a large size by vacuum brazing, whereas uniquely strontium has this advantage. It is believed that the strontium restricts the growth of large silicon particles during slow solidification of the brazed alloy during cooling of the heat exchanger or other large section brazed sample from the brazing temperature. It is possible that in flux dip brazing the flux in some way modifies the solidification behaviour of the braze metal.

In British patent specification No. 1 584 580 the effect of fluxless brazing large structures is considered. It is stated that when large objects, such as heat exchangers, are to be brazed they require long heating periods and it is necessary to consider the behaviour of silicon, magnesium or similar elements in the brazing alloy. It is stated that during the long heating cycles silicon, magnesium or other elements in the brazing alloy may diffuse from the molten brazing alloy in the outer portions of the core, which was initially of the eutectic composition, into the base material of the separator or the fin, and the fillet may disappear. Where such diffusion occurs the structure may become too weak for use as a heat exchanger. It is stated that the solution to this problem, particularly when considering silicon diffusion, lies in the realisation that silicon diffuses more easily at the grain boundary than into the grain itself. Thus the solution proposed is to use large grain sized structures in the aluminium alloy.

It is not clear why strontium alone enables stronger large section structures to be made by vacuum brazing.

An analysis of the prior art has shown that it is known to use aluminium-silicon-magnesium alloys for the brazing of aluminium structures. Such alloys are described, for example, in British patent specification No. 1 067 024, referred to above, or in U.S. Pat. specification No. 3 853 547. The latter U.S. patent specification also describes the use of aluminium-silicon-magnesium alloys containing small quantities of bismuth. However, the U.S. patent specification makes no reference to the problems of vacuum brazing large structures, nor does it suggest the use of elements to increase the strength of brazed joints in such structures.

There are also a number of prior specifications which describe aluminium-silicon alloys containing bismuth and/or strontium, such as British patent specification No. 1 328 642. The alloys of this patent are, however, intended for use in fluxless brazing of the furnace brazing type, i.e. are intended for use in a non-oxidising atmosphere or an atmosphere containing little oxygen. These specifications are not, therefore, concerned with vacuum brazing alloys and appear to require large quantities of barium to be present in those alloys which utilise strontium.

There is no description of magnesium-containing alloys which incorporate strontium for use in vacuum brazing. In fact in British patent specification No. 1 462 506, by the same applicants, it is specifically stated that magnesium in excess of 0.11% by weight gives rise to unsatisfactory joints when soldering under a protective gas atmosphere.

A further range of fluxless brazing alloys are described in British patent specifications Nos. 1 333 030 and 1 379 139 but these relate to zinc based alloys rather than to the aluminium based alloys of the present invention. Again, these prior art specifications make no reference to problems associated with the vacuum brazing of large section structures nor to any solution to such problems.

In German OLS No. 2 213 272 there is described the use of a fluxless brazing alloy comprising aluminium plus 4% to 20% silicon plus 0.001% to 1% of an alkaline metal, such as sodium, potassium or lithium, but the invention is not concerned with strontium-containing alloys as is the present invention.

In USSR patent specification No. 476 951 there is described an aluminium based soldering alloy having good corrosion resistance in moist or maritime atmospheres, but the alloy although containing 0.05% to 0.1% strontium contains high levels of germanium and manganese. The abstract makes no reference to the vacuum brazing of large structures.

Embodiments of the invention will now be described by way of example.

DESCRIPTION OF THE PREFERRED EMBODIMENTS

Once the surprising effect of strontium on improved strength in the vacuum brazing of large aluminium structures had been discovered an analysis of the prior art indicated that either sodium or strontium has been proposed as modifiers for silicon particles in aluminium alloys. However, apart from British patent specification No. 1 584 580 referred to above, no prior information appears to exist relating to the study of strength problems in large section vacuum brazed aluminium structures.

It will be appreciated that British patent specification No. 1 584 580, which was published after the priority of the present application, teaches a different solution to the problems of fluxless brazing large structures, compared to that of the present invention.

Initial attempts were made, therefore, to compare the use of strontium and sodium as modifiers on aluminium-siliconmagnesium-bismuth alloys. Two alloys were made up, one containing 0.06% strontium and the other containing 0.06% sodium. The alloys were manufactured, were double melted and the amount of silicon refinement compared. It was noticed that considerable refinement was obtained with strontium but none at all with sodium. On the basis of this evidence it was concluded that strontium as such was a better modifier than sodium.

Prior art references to silicon refinement appear to regard strontium, sodium, potassium and lithium as equal alternatives. It is surprising to discover, therefore, that in relation to the vacuum brazing of large section structures strontium alone is an efficient strength improver. Furthermore, as will be described below, there is a minimum requirement for the presence of strontium to give effective strength improvements in the structure.

As has been explained above the problems of strength of the brazed joints appear principally to be associated with the vacuum brazing of large section structures which are cooled in the absence of a flux. Basically, these large section structures have to be cooled slowly to prevent distortion, and also it is physically not possible to cool them at a high rate. Thus, after the brazing operation itself is complete there is a considerable period whilst the brazing alloy is solidifying and coarse low strength silicon microstructures can develop within the brazing alloy.

Various samples were, therefore, prepared and each sample was subjected to a vacuum brazing cycle and the solidified braze structures analysed. The vacuum brazing cycle comprised manufacturing the alloy, cooling and then remelting and slow cooling the alloy at a cooling rate of about 2° C. per minute. This compares with a cooling rate of in excess of 10° C. per minute which can be obtained with small section structures.

The method of comparison used to examine the samples was to count the number of silicon particles existing in a unit area of the slow cooled sample. The following information was generated.

A—The base alloy comprising an aluminium-silicon-magnesium-bismuth alloy with normal impurities but no deliberately added strontium had 3 particles per unit area.

B—Additions of 0.001% strontium to the base alloy had very little effect.

C—0.016% additions of strontium to the base alloy had very little effect; after slow cooling the count averaged at 5 particles per unit area.

D—The base alloy with the addition of 0.075% strontium showed 10 to 15 particles per unit area.

E—The addition of 0.12% strontium to the base alloy showed in excess of 30 particles per unit area both on fast cooling, ie as originally melted, and after the slow cooling which occurred following a two-hour hold above the melting point of the alloy.

It was also found that impurities conventionally found in these types of alloys had a significant effect on the silicon particle size. The addition of 0.1% strontium to a substantially impurity free base alloy gave over 1 000 particles per unit area.

It can be seen, therefore, that there is a critical effect of the additon of strontium somewhere between 0.075% and 0.12% and that it is essential that the strontium level be in excess of 0.075% for effective operation of the invention. Typically, the strontium level could be 0.1, 0.11, 0.12, 0.13, 0.14, 0.15% or more for effective operation. It is also possible that 0.09% or 0.095% strontium may be possible.

No deleterious effects of the addition of strontium have been determined, but for economic reasons it is believed that it is not sensible to have strontium present in greater amounts than 1.5%.

As will be detailed below strontium containing alloys as vacuum brazing alloys lead to the manufacture of heat exchangers which are twice as strong as heat exchangers made with strontium free alloys. Such an increase in hydraulic strength is clearly of very great economic significance.

The table below shows that with essentially identical heat exchangers which were brazed at the same time in the same vacuum furnace and hence cooled at the same rate, the addition of 0.1% strontium to a brazing alloy basically comprising aluminium plus 10% silicon plus 1.5% magnesium plus bismuth led to a virtual doubling of the strength of the joints compared to the strontium-free alloy. Thus the strontium containing alloy withstood a maximum stress of 42.7 MPa (MegaPascals) whereas the strontium-free alloy withstood only a maximum stress of 22.7 MPa. It will be noted that in both cases the failure occurred in the fin braze, i.e. in the brazing material where the fin abuts the tube plate, and hence this is a good indication of the actual strength of the brazing alloy.

| Test No | Brazing Alloy | Cooling rate through solidus °C./min | Hydraulic failure pressure MPa | Failure location | Maximum stress in joint MPa |
|---|---|---|---|---|---|
| 5 | 0.1% Sr | 1.5 | 19.29 | Fin braze | 42.7 |
| 6 | No Sr | 1.5 | 10.34 | Fin braze | 22.7 |

We claim:

1. A clad sheet of aluminum for use in the vacuum brazing of large section structures, the clad sheet having on at least one of its sides a brazing alloy consisting essentially of by weight silicon 4.5% to 13.5%, magnesium up to 3%, strontium 0.1% to 0.3%, balance aluminum apart from incidental impurities.

2. A clad sheet of aluminum as in claim 1 wherein the brazing alloy is provided on both sides, the core being selected from the group consisting of commercially pure aluminum and aluminum alloys different from the brazing alloy.

3. A clad sheet of aluminum as in claim 1 wherein the magnesium content of the brazing alloy is in the range 1% to 2% by weight.

4. A clad sheet of aluminum as in claim 1 wherein the silicon content of the brazing alloy is in the range 8% to 12% by weight.

5. A clad sheet of aluminum for use in the vacuum brazing of large section structures, the clad sheet having on at least one of its sides a brazing alloy consisting essentially of by weight silicon 4.5% to 13.5%, magnesium 0.5% to 3%, strontium 0.1% to 1.5%, balance aluminum apart from incidental impurities.

6. A clad sheet of aluminum as in claim 5 wherein the brazing alloy is provided on both sides, the core being selected from the group consisting of commercially pure aluminum and aluminum alloys different from the brazing alloy.

7. A clad sheet of aluminum as in claim 5 wherein the magnesium content of the brazing alloy is 1.5% by weight.

8. A clad sheet of aluminum as in claim 5 wherein the silicon content of the brazing alloy is in the range 8% to 12% by weight.

9. A clad sheet of aluminum for use in the vacuum brazing of large section structures, the clad sheet having on at least one of its sides a brazing alloy consisting essentially of by weight silicon 4.5% to 13.5%, magnesium up to 3%, strontium 0.1% to 0.3%, bismuth 0.1% to 4%, balance aluminum apart from incidental impurities.

10. A clad sheet of aluminum for use in the vacuum brazing of large section structures, the clad sheet having on at least one of its sides a brazing alloy consisting essentially of by weight silicon 4.5% to 13.5%, magnesium 0.5% to 3%, strontium 0.1% to 1.5%, bismuth 0.1% to 4%, balance aluminum apart from incidental impurities.

* * * * *